United States Patent [19]

Visser

[11] Patent Number: 4,750,748
[45] Date of Patent: Jun. 14, 1988

[54] SHAFT SEAL WITH FLEXIBLE MIDPORTION AND GARTER SPRING

[75] Inventor: Teunis Visser, Sliedrecht, Netherlands

[73] Assignee: IHC Holland N.V., Papendrecht, Netherlands

[21] Appl. No.: 885,703

[22] Filed: Jul. 15, 1986

[30] Foreign Application Priority Data

Jul. 15, 1985 [NL] Netherlands .................. 8502033

[51] Int. Cl.⁴ ............................................. F16J 15/32
[52] U.S. Cl. ..................................... 277/153; 277/163; 277/164
[58] Field of Search ............... 277/152, 153, 163, 164, 277/51

[56] References Cited

U.S. PATENT DOCUMENTS 2,437,901  3/1948  Winkeljohn ................... 277/153
4,168,070  9/1979  Tsuchihashi et al. .......... 277/153 X

FOREIGN PATENT DOCUMENTS 0033963   8/1981  European Pat. Off. .
 354105   6/1922  Fed. Rep. of Germany ...... 277/163
 711737  10/1941  Fed. Rep. of Germany ...... 277/153
 718438   3/1942  Fed. Rep. of Germany ...... 277/153
3307470   3/1984  Fed. Rep. of Germany ...... 277/153
1024718   1/1953  France ............................. 277/153
 379967   9/1932  United Kingdom ................ 277/153

Primary Examiner—Robert S. Ward
Attorney, Agent, or Firm—Young & Thompson

[57] ABSTRACT

Shaft seal consisting of an annular body of elastic material, comprising a fastening flange (1;12), a substantially axially extending flexible hinge portion (6;13) and a sealing lip (7;14). The fastening flange, hinge portion and sealing ring (5) form a single piece, and the sealing ring (7;14) has a cylindrical contact surface with the shaft extending over substantially the entire length of the sealing ring. This length is sufficient to receive one or more tensioning elements (10,11; 15,16) of an operative width to guide the sealing ring concentrically on the shaft over its entire axial length.

4 Claims, 2 Drawing Sheets

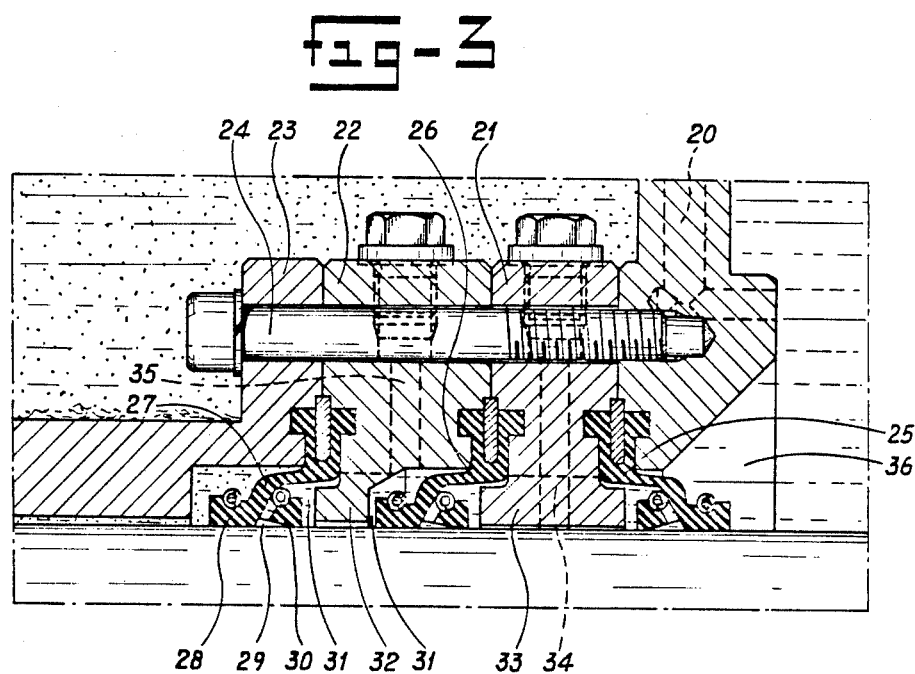

SHAFT SEAL WITH FLEXIBLE MIDPORTION AND GARTER SPRING

The invention relates to a shaft seal consisting of an annular body of elastic material which on its outer periphery has a fastening flange, is in contact with the shaft by means of a sealing lip whose outer surface is acted on by an endless garter spring extending around it in the peripheral direction, and which between the fastening flange and the sealing lip has a membrane-like hinge part which extends substantially in the axial direction and which in the radial direction is flexible and is free to move, said fastening flange, hinge part and sealing lip forming a single piece.

A seal of this kind is known, for example from Dutch Preliminary Published Patent Application No. 7614108, Dutch Patent Application No. 6911808, European Patent Application No. 0033964, and many others.

In all these known sealing rings the sealing lip has a sharp edge which bears against the shaft, and from which inclined annular surfaces extend divergently away from the shaft. This sharp edge may become somewhat flattened through the action of deformation, but continues to function substantially as a sharp edge.

These known seals have a number of shortcomings.

In the first place it is remarkable that this type of seal has been in use for many decades without fundamental changes being made to the original form of this type of shaft sealing ring. The original form of these sealing rings has an elastic lip pressed into contact by an annular garter spring.

These known seals are reasonably satisfactory when certain operating conditions have to be met. The so-called PV value, that is to say the product of the difference in pressure over the seal and the peripheral velocity of the shaft, must not exceed determined values.

Also of importance is the maximum permissible eccentricity consisting of static and dynamic eccentricity. This is low. For example, with a peripheral velocity of 5–10 meters per second and with a diameter of 300 millimeters, the eccentricity may amount to only 0.4–0.7 millimeter.

At the sharp edge of the sealing lip a lubricating film is formed as the result of elastohydrodynamic effects, but this is seldom complete. Very often it is a question of only extreme boundary lubrication. Extreme boundary lubrication in turn gives rise to frictional heat, which itself must be dissipated in order not to exceed the permissible operating temperature of the elastomer. If this should however occur, the structure of the elastomer will be changed, and it will become so hard that grooves will be worn in the shaft or the bushes.

On each revolution a shaft makes all kinds of small movements. The initial stress of the sealing lip, the tension of the garter spring, and the difference in pressure over the seal, in conjunction with the flexiility of the seal, particularly in the hinge part, must ensure that the seal can follow the movements of the shaft. Because of the initial stress and of vibrations, the contact surface of the sealing lip undergoes continuous shock loading, because liquid around the lip is forced away at the shaft frequency but always returns. As long as the sealing lip can follow the shaft, the hydrodynamic effects will also continue to occur, so that the seal remains functional for a long time. The flexibility of the hinge part is here also of great importance.

In operation, during the following of the movements of the shaft an undefinable deformation takes place at the sealing lip, in the wedge-shaped space situated on the membrane side of the sealing lip. This deformation continuously varies in the peripheral direction and is caused by:

non-concentric mounting of the seal with respect to the shaft;

shaft movements in the radial direction due to bearing play, and manufacturing inaccuracy in the shape of the sealing lip in the peripheral direction.

The shaft may also be out of true, assuming positions which may vary continuously in dependence on radial movements of the shaft, and this may result in axial movements of the sealing lip with respect to the shaft.

The difference in pressure over the seal and the influence of temperature may in addition lead to deformation.

With these known seals a pumping action occurs in the wedge-shaped space formed in the axial direction and in the peripheral direction. In the peripheral direction the wedge-shaped space varies considerably, so that hydrodynamic pressure builds up in it through the rotation of the shaft. The liquid pressure in this wedge-shaped space is higher than the pressure of the liquid to be sealed, so that liquid passes from the membrane side or heel to the front side or nose of the sealing lip. In many cases this has an advantageous action, because any leakages from the seal are pumped back.

However, situations may arise in which the wedge shape occurs on the nose side of the sealing lip, for example as the result of overloading when considerable pressure differences occur, or as the result of wear. The pump action then increases leakage.

When the known seals are used for separating liquids, it frequently happens that liquid is pumped from the heel side to the nose side of the sealing lip. This results in the mixing of the liquids which should be separated or sealed with respect to one another.

If a plurality of sealing lips are disposed one behind the other, for example in the case of a ship's propeller shaft, very undesirable situations in respect of the PV values frequently occur in the separate sealing lips. In the case of the serial arrangement of sealing rings of the known type, with interposed chambers, the pumping action and temperature changes in this chamber or these chambers give rise to a lowering of the pressure, which in turn results in higher temperatures and wear, after which the pressure in these chambers rises again and then falls again. In the case of a propeller shaft seal this may have the consequence that seawater will reach the oil.

In addition, dirt is brought into the seal by the pumping action and may be carried in the direction of the bearing.

The invention now seeks to provide a sealing ring by means of which the disadvantages outlined above can be overcome in a very simple manner.

According to the invention this aim is achieved in that the sealing lip is in contact with the shaft by means of a cylindrical contact surface which extends over substantially the entire length of the sealing lip, this length being such that the sealing lip provides room for one or more tensioning elements of an operative width such that the sealing lip is always guided on the shaft concentrically to the latter over its entire axial length.

Because of the large axial contact surface between the sealing lip and the shaft, the lip cannot undergo any angular displacements with respect to the shaft. At the same time the hinge part ensures that this cylindrical sealing lip follows the eccentric movements and the inclination of the shaft in such a manner that it always remains concentric to the shaft. The ring thus cannot tilt and there is consequently also no pumping action. The tensioning element or elements ensures or ensure that the body of the sealing lip retains the correct cylindrical shape.

The hinge part may adjoin the sealing lip at a point situated between the garter springs. In that case the desired length of the hinge part will usually result in a seal in which the fastening flange is situated to the side of the nearest edge of the sealing lip. It is now in fact no longer possible to speak of a sealing lip, but only of a sealing ring.

However, the hinge part may also be attached to one edge of the sealing ring.

According to the invention, it is in addition of importance that the hinge part of the sealing ring has a length such, and adjoins the sealing and/or the fastening flange with a curvature such that the ring is axially displaceable. Axial movability is thus possible without resulting in the tilting of the sealing ring. Expansion of the medium to be sealed can thus be taken into account, particularly when this occurs between two sealing rings disposed one behind the other.

It may be observed that DOS No. 29 42 712 discloses a seal in which the sealing lip provided with a garter spring likewise has a cylindrical contact surface. This cylindrical surface is short; it corresponds to only one garter spring, and the hinge part is disposed radially instead of being disposed axially. Radial movements of the shaft and its inclination are therefore poorly followed, so that leakage again occurs. Dutch Preliminary Published Patent Application No. 6702658 also discloses a seal which consists of a fastening flange, a hinge part extending substantially axially, and a sealing lip which has a narrow cylindrical contact surface behind which a single garter spring is disposed. In this known sealing ring it is also not possible to prevent the tilting of the sealing lip, so that a pumping action nevertheless still takes place. FIG. 3 of the previously mentioned European Patent Application No. 0033964 also shows a sealing lip provided with a garter spring and having a cylindrical contact surface. This is however formed by radial pressure. In the unstressed state it has the sharp edge shown in FIGS. 2 and 4. Furthermore, in this sealing ring the portion connecting the fastening flange to the sealing lip extends substantially radially and is so short and supported and reinforced with metal parts that it is practically impossible for radial movements of of the shaft to be followed. The deformation taking place in this known sealing lip results in considerable wear.

If a plurality of sealing rings are disposed one behind the other, with interposed chambers, further problems arise because a liquid which is for example contained in a chamber of this kind, such as oil, will disappear as the result of expansion through raised temperatures. Subsequent cooling results in a drop in pressure, which in turn brings about increased surface pressure. This in turn leads to wear and finally to leaks. According to the invention each sealing ring in the sealing lip can now have a bore connecting a lubricating groove extending in the contact surface of the sealing lip to a chamber situated between successive sealing rings. Better lubrication of the bearing surface is thus achieved.

The invention will now be explained more fully with the aid of the drawings.

FIG. 3 illustrates the application of the seal according to the invention to a propeller shaft bearing.

Figure 1:
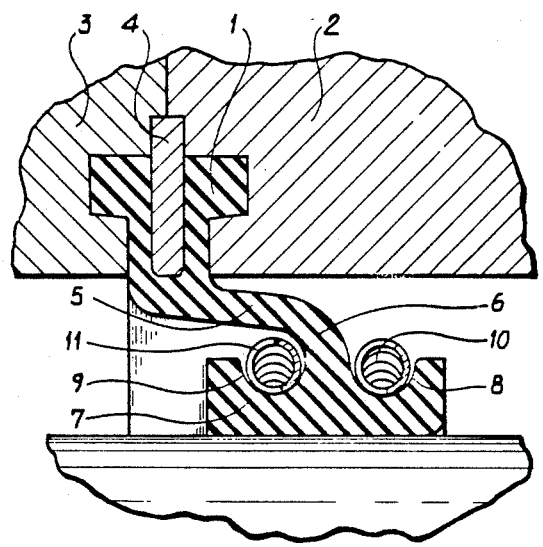
FIG. 1 is a section of one form of construction of the seal according to the invention.

The seal shown in FIG. 1 consists of a fastening flange 1, which is clamped between two casing parts 2 and 3 with the aid of a stiffening ring 4. To this fastening flange 1 is attached a hinge portion or membrane portion 5 which extends substantially axially and which merges by way of a curvature 6 into the sealing ring 7, which here is in the form of a cylindrical foot provided on each side of the curvature with grooves 8 and 9 for garter springs 10 and 11 respectively, the latter being so disposed that they press the ring 7 over its entire axial length against the shaft.

The sectional shape shows clearly that this ring 7 will follow radial movements of the shaft and also inclinations of the shaft accurately, without being able to make tilting movements or angular displacements with respect to the shaft itself. On the other hand, slight axial movements are certainly possible through flexibility in the axial direction of the hinge portion 5 and through the bending of the curved portion 6.

Figure 2:
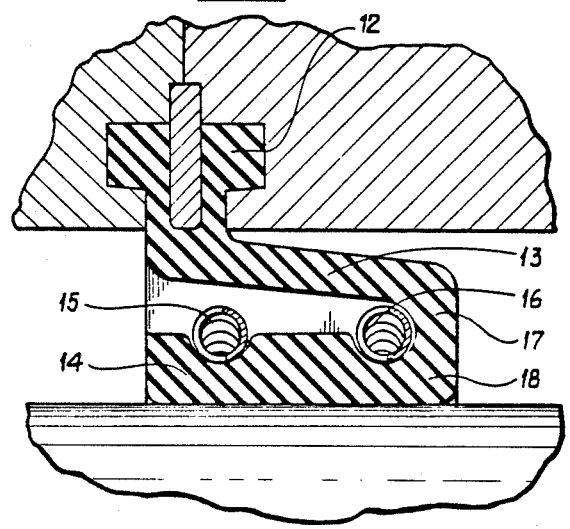
FIG. 2 is a section of another form of construction.

FIG. 2 shows an embodiment having a fastening flange 12, a hinge portion 13 connected thereto, and a sealing ring 14, which is in turn provided with grooves and garter springs 15 and 16 respectively, which are likewise so situated that they press the ring 14 into contact over its entire axial length.

The difference from the embodiment shown in Figure 1 is that the hinge portion 13 is connected to the ring 14 by way of the vertical bridge portion 17 at the outer edge 18 of the foot 14.

Examination of this sectional drawing will make it clear that this embodiment also enables all displacements of the shaft to be followed without tilting movements and therefore without a pumping action.

FIG. 3 illustrates the application of a plurality of sealing rings of the type shown in FIG. 1 to a propeller shaft bearing. A number of rings 21 and 22 are clamped fast on the casing 20 with the aid of a flange 23 and bolts 24. Between these rings are clamped the sealing rings 25, 26, and 27, the rings 26 and 27 being disposed in tandem and the rings 25 and 26 being disposed back to back.

All the sealing rings have in the bearing surface 28 an annular lubricating groove 29, which is in communication via a bore 30 with a chamber 31 between two sealing rings The volume of this chamber is made small with the aid of a rim 32 extending into the chamber.

Between the sealing rings 25 and 26 a rim 33 is similarly disposed.

These chambers can be filled with a lubricant via the bores 34 and 35 respectively.

Oil lies to the right of the seal, at 36. Seawater lies on its left.

Since no pumping action takes place, the oil will not leak out in the direction of the seawater, but will provide lubrication for the bearing surfaces. This lubrication can have the consequence that an extremely small part of the oil from the space 36 passes into the chambers lying between the sealing rings, which oil must then first pass under the foot of the sealing ring 25, then comes via the bore into the next chamber, and so via bore and bearing surface along one or more sealing rings. This is however a very gradual movement which is brought about by a pressure difference between oil and seawater over the deficient lubricating film, and which is not the consequence of a detrimental pumping action. There is then also no fear of soiling.

However, in the reverse direction there is also no penetration of seawater, dirt, etc. in the direction of the oil chamber 36.

What is claimed is:

1. Shaft seal consisting of an annular body of elastic material which on its outer periphery has a fastening flange, is in contact with the shaft by means of a sealing ring whose outer surface is acted on by an endless garter spring extending around it in the peripheral direction, and which between the fastening flange and the sealing ring has a membrane-like hinge part which extends substantially in the axial direction and which in the radial direction is flexible and is free to move, said fastening flange, hinge part and sealing ring forming a single piece, the sealing ring being in contact with the shaft by means of a cylindrical contact surface which extends over substantially the entire length of the sealing ring, this length being such that the sealing ring provides room for at least one tensioning element of an operative width such that the sealing ring is always guided on the shaft concentrically to the latter over its entire axial length, the hinge part being attached to the sealing ring at a point situated between plural tensioning elements.

2. Shaft seal according to claim 1, characterized in that the hinge part is attached to an edge of the sealing ring.

3. Shaft seal according to claim 1, provided with a plurality of sealing rings disposed one behind the other, with interposed chambers, characterized in that each sealing ring has a bore which brings a lubricating groove extending in the contact surface of the sealing ring into communication with a chamber situated between succssive sealing rings.

4. Shaft seal according to claim 1, in which the hinge part is attached to the sealing ring between two said tensioning elements and extends transversely from the sealing ring at its point of securement to the sealing ring and curves in a direction away from the sealing ring into a portion which extends substantially in the axial direction, this latter portion terminating in said fastening flange.

* * * * *